(No Model.)

J. S. ELLIOTT.
MILK GAGE.

No. 379,692. Patented Mar. 20, 1888.

WITNESSES:
J. H. Clark.
C. Sedgwick.

INVENTOR:
J. S. Elliott
BY Munn & Co.
ATTORNEYS.

UNITED STATES PATENT OFFICE.

JOHN SMITH ELLIOTT, OF BOMBAY, NEW YORK.

MILK-GAGE.

SPECIFICATION forming part of Letters Patent No. 379,692, dated March 20, 1888.

Application filed October 13, 1887. Serial No. 252,215. (No model.)

*To all whom it may concern:*

Be it known that I, JOHN SMITH ELLIOTT, of Bombay, in the county of Franklin and State of New York, have invented a new and Improved Milk-Gage, of which the following is a full, clear, and exact description.

My invention relates to a device to be inserted in milk-cans and adjustably held therein, so as to indicate the height of the milk in the can and determine whether the can contains the same quantity of milk on arrival at the depot as it did when shipped. The device is also adapted to be extended and used as a milk scale or measurer.

The invention consists in a rod or bar formed in sections connected together so as to be folded up and adjusted upon one another, and also to be extended and clamped to serve as a milk-scale.

The invention will be pointed out in the following description and claim.

Reference is to be had to the accompanying drawings, forming a part of this specification, in which similar figures of reference indicate corresponding parts in both views.

Figure 1:
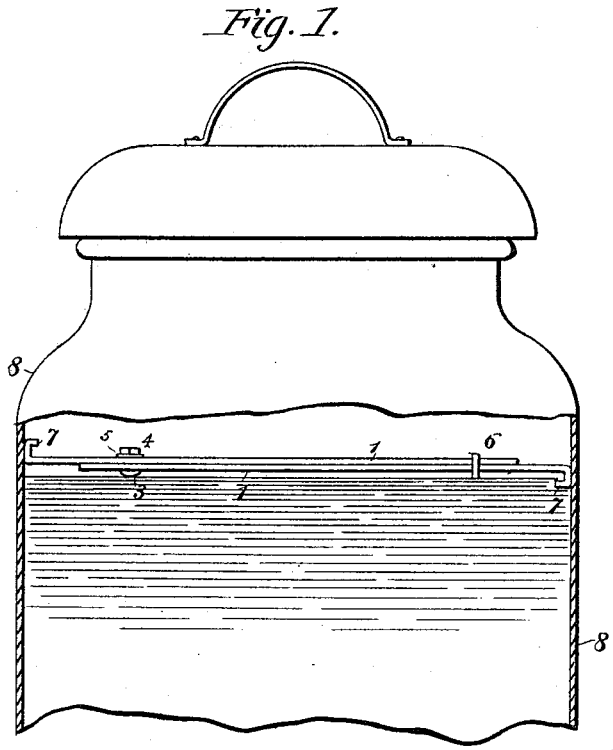
Figure 2:
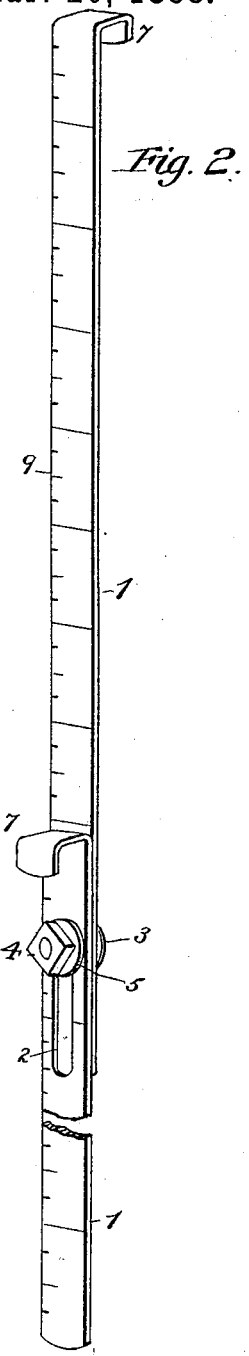

Figure 1 represents my device in position in a milk can to indicate the height of the milk therein, and Fig. 2 shows it in extended position to serve as a milk-scale.

In the construction of my device I employ two rods or bars, 1, of metal or other suitable material, connected together by means of a slot, 2, and bolt and nut 3 4, and washer 5, and having a link, 6, whereby they may overlap one another and be held in adjustment by means of the bolt and nut 3 4 and link 6. The outer ends of the bars 1 are formed with square hooked ends 7, to adapt them to fit against the sides of a can, 8. The bars 1 are also provided with a scale, 9, to adapt them when in an extended position to measure milk.

In employing my device to determine the height of the milk in the can, I fold the bars 1 1 over one another, with the link 6 slipped over them, and insert them horizontally in a milk-can, 8, until the folded sections 1 1 are brought to the surface of the milk therein, when the bars 1 1 are adjusted laterally until the ends 7 fit against the sides of the can 8. The bars 1 1 are then held in adjusted position by means of the washer 5 and tightening-bolt and nut 3 4 in the slot 2. The device remains in this position until the can arrives at the place of delivery. Upon opening the can it will indicate whether the same quantity of milk remains as was shipped. The can is then filled with skim-milk to the height of the device, and upon being returned to the original place of shipment it will be seen whether the same quantity of skim-milk is contained in the can as there was of milk in the first instance.

To employ the device to measure milk, the link 6 is slid off of the folded sections 1 1, and upon releasing the bolt and nut 3 4 the sections are extended in a continuous line, and the bolt and nut are then tightened. The device may then be used, by means of the scale 9 thereon, to measure a quantity of milk.

The square hooked ends 7 afford a bearing-surface whereby the ends of the device are held in clamped position against the walls of the can.

Having thus fully described my invention, what I claim as new, and desire to secure by Letters Patent, is—

As a new article of manufacture, a milk-gage consisting of the two sections 1 1, overlapped at their inner ends, one of which is slotted and bent at right angles in opposite directions at their outer ends to form the flat bearing-surfaces 7 7, the clamping bolt and nut, the sliding link 6, and a scale, 9, on said sections to measure milk, substantially as set forth.

JOHN SMITH ELLIOTT.

Witnesses:
 A. FULTON,
 J. C. CONNELLY.